United States Patent [19]
Neubauer et al.

[11] Patent Number: 6,148,308
[45] Date of Patent: Nov. 14, 2000

[54] METHOD OF SELECTING AND REPRESENTING TIME-VARYING DATA

[76] Inventors: Edward J. Neubauer, 2704 Nighthawk, Plano, Tex. 75025; Richard J. Gallaway, 2304 Woodfield Way, Bedford, Tex. 76021; Juanita F. Bowden, 4100 Mesa Dr., Plano, Tex. 75074

[21] Appl. No.: 08/055,802

[22] Filed: Apr. 30, 1993

Related U.S. Application Data

[63] Continuation of application No. 07/645,039, Jan. 23, 1991, abandoned.

[51] Int. Cl.$^7$ .................................................. G06F 17/30
[52] U.S. Cl. .................................................. 707/203
[58] Field of Search ................... 395/650, 155, 395/161, 144–149; 364/419.17; 707/203

[56] References Cited

U.S. PATENT DOCUMENTS

| | | | |
|---|---|---|---|
| 4,646,250 | 2/1987 | Childress et al. | 707/507 |
| 4,912,669 | 3/1990 | Iwamoto et al. | 707/531 |
| 4,939,689 | 7/1990 | Davis et al. | 707/102 |
| 4,949,300 | 8/1990 | Christenson et al. | 707/500 |
| 5,058,185 | 10/1991 | Morris et al. | 345/331 |
| 5,168,446 | 12/1992 | Wiseman | 705/37 |
| 5,212,639 | 5/1993 | Sampson et al. | 705/30 |
| 5,297,249 | 3/1994 | Bernstein et al. | 345/356 |
| 5,339,392 | 8/1994 | Risberg et al. | 345/333 |
| 5,386,581 | 1/1995 | Suzuki et al. | 707/515 |
| 5,440,730 | 8/1995 | Elmasri et al. | 707/203 |
| 5,450,537 | 9/1995 | Hirai et al. | 707/507 |

OTHER PUBLICATIONS

Computer, vol. 19, No. 9, Sep. 1986, Long Beach U.S., pp. 35–42, R. Snodgrass & I. Ahn: "Temporal Databases".
Proceedings Of The 3rd International Conference On Data Engineering, Feb. 3, 1987, Los Angeles, U.S., pp. 528–537, J. Clifford & A. Croker: "The Historical Relational Data Model (HRDM) and Algebra based on Lifespans".
Acerson, Word Perfect: The Complete Reference, 1988, p. 260–262, 625, 760–763.
Ullman, Principles of Database Systems, 1982, p. 24, 1982.
Bittel, ed., Encyclopedia of Professional Management, 1978, p. 373, 645, 646, 1978.

*Primary Examiner*—Anton W. Fetting
*Attorney, Agent, or Firm*—Fenwick & West LLP

[57] ABSTRACT

A method of selecting and representing time-varying data from a time-relational database management system by providing a unified view on a computer display screen. The data from a master record for a particular entity is displayed with a default video or character attribute, and is considered to be the current record. Accessing a history record for that entity causes the data for fields that differ from the corresponding fields of the current record to be overlaid on such current record fields but with a video or character attribute distinct from the default video or character attribute. The overlaid current record becomes a new current record for further overlays. Similarly, accessing a pending record causes the data for fields that differ from the corresponding fields of the current record to be overlaid on such current record fields but with a video or character attribute distinct from the default video or character attribute. A plurality of history or a plurality of pending records may be composited so that all of the changed fields for a set of records from the end of a defined time period can be overlaid on a current record at one time. Accessing an error record causes the data for fields that differ from the corresponding fields of the current record (current as of the date of the error record) to be overlaid on such current record fields but with a video or character attribute distinct from the default video or character attribute. Fields in the error record that are in error (whether changed or not from the current record data) are overlaid on the current record fields but with a video or character attribute distinct from both the default video or character attribute and the video or character attribute used to indicate changed fields in the error record.

14 Claims, 5 Drawing Sheets

| | | | |
|---|---|---|---|
| MASTER RECORD | HEADER | KEY FIELD | USER SPECIFIED DATA |
| PENDING RECORD | HEADER | KEY FIELD | CHANGES TO BE APPLIED |
| ERROR RECORD | HEADER | ERROR | KEY | ATTEMPTED CHANGES |
| HISTORY RECORD | HEADER | KEY FIELD | REPLACED DATA |

```
SCREEN/LEV/CMD                                          REQUEST/TYP
WAUSUBSD 03                                                         PAGE 1/3
06/01/89 08:18:02

800 SERVICE
                     SUBSCRIBER RECORD

800 # 555-2010                         EFFECTIVE DATE 06 / 01 / 89
                                                PRIORITY N

STATUS A    (A,D,I,O)

SUBSCRIBER  SCIENTIFIC ADVISORY COUNCIL
               1234 HOLST DR.  DALLAS TX 75432

TERMINATING # 214-555-2010

SERVICE AREAS
      NETWORK ___
      STATE   ___
      AREA CODES  214  817  512

RECORD SECURITY : FONESROS 800SVC DALLAS
CHANGED ON 05/30/89 09:32 FOR 06/01/89 BY (M) TBAKER
  SF1=SCREEN HELP         F4=JUMP                      F10=APPLY COMMAND
```

METHOD OF SELECTING AND REPRESENTING TIME-VARYING DATA

This is a continuation of application Ser. No. 07/645,039 filed on Jan. 23, 1991, now-abandoned.

BACKGROUND OF THE INVENTION

1. Field of the Invention

This invention relates to computer databases, and in particular to a method of selecting and representing time-varying data from a time-relational database management system.

2. Description of Related Art

A database management system (or "DBMS") is generally a complex computer program designed to define data records, add, delete, and modify such records, and output selected parts of such records to a computer display screen or printed reports. Records are collections of related data typically organized in fields each having pre-defined characteristics. Records of a similar type are stored in one or more files.

In some applications, a DBMS may be adapted to generate and retain records that change over time but which relate to a single DBMS entity (such as a customer or product). Such DBMS maintain a file of "master" records containing current information. Such a DBMS also typically maintains a file of one or more "history" records for each master record, indicating pre-change versions of the master record, and a file of "future" or "pending" records associated with a master record, indicating changes that are to be made to the master record at a specified time or upon the occurrence of a specified event. Such DBMS' are known as time-relational database management systems (or "TDBMS").

A TDBMS may also maintain a file of error records, showing changes that have not been applied to a corresponding master record or entered into the pending record file due to internal errors (such as out-of-range data or mis-typed data).

An important function of a well-designed DBMS is the ability to output information in a concise but understandable manner. Most DBMS' have a "browse" function that permits a user to display a "view" of selected data relating to an entity on a computer display screen, and to access the corresponding data for a next or a previous entity at the touch of a key. A "view" may comprise some or all of the data fields of a logical record (which itself comprises one or more physical records), or some or all of the data fields of multiple logical records.

The function of browsing may be useful to view records belonging to different entities, such as customers or products, where the data fields are expected to change significantly between records. However, for a particular entity, such as a single customer, simple browsing between the time-related records (i.e., pending and history records for that entity) can be confusing and lead to errors, since small differences between the data fields from one time-related record to a next may not be obvious to the user.

The present invention provides a solution to the problem of viewing time-related data records such that differences in the master, pending, and history records for a particular entity are clearly evident to a user. The present invention also provides a method for clearly indicating to a user differences between a master or pending records and any error records.

SUMMARY OF THE INVENTION

The present invention provides a method of representing time-varying data records from a time-relational database management system by providing a unified view on a computer display screen. The data from a master record for a particular entity is displayed with a default video or character attribute, and is considered to be the "current" record. Accessing a history record for that entity causes the data for fields that differ from the corresponding fields of the current record to be displayed in place of (or "overlaid on") such current record fields but with a video or character attribute distinct from the default video or character attribute. The overlaid current record becomes a new current record for further overlays.

Similarly, accessing a pending record causes the data for fields that differ from the corresponding fields of the current record to be overlaid on such current record fields but with a video or character attribute distinct from the default video or character attribute.

A plurality of history or a plurality of pending records may be "composited" so that all of the changed fields for a set of records from the end of a defined time period can be overlaid on a current record at one time.

Accessing an error record causes the data for fields that differ from the corresponding fields of the current record (current as of the date of the error record) to be overlaid on such current record fields but with a video or character attribute distinct from the default video or character attribute. Fields in the error record that are in error (whether changed or not from the current record data) are overlaid on the current record fields but with a video or character attribute distinct from both the default video or character attribute and the video or character attribute used to indicate changed fields in the error record.

The details of one embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Throughout this description, the preferred embodiment and examples shown should be considered as exemplars, rather than limitations on the method of the present invention.

TDBMS File Structure

Figure 1:
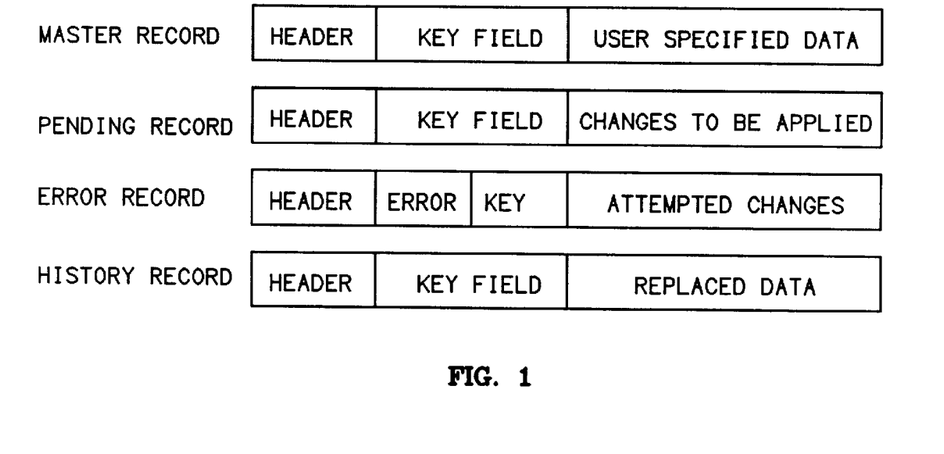
FIG. 1 is a diagrammatic example of the record structure of a time-relational database system in accordance with the present invention.

An example of a time-relational database system record structure is shown in FIG. 1. Each unique entity, such as a customer or a product, has at least a master record 10 associated with the entity. In addition, depending on whether changes have been attempted to the master record, each entity may have associated pending 11, history 12, and error 13 records.

In the preferred embodiment, for all entities, the master, pending, history, and error records have a common header field that includes a primary search key (typically a customer number, telephone number, or other unique number). The records other than the master record have additional information included in the primary key for uniqueness. In the preferred embodiment, the master record is the only record that actually contains all data fields. Each pending record contains changed fields that will be used to alter the master record at a later time. Each history record stores the "before" images of changed fields from a master record. Each error record stores attempted change fields, plus an error code. In the preferred embodiment, the "change" fields for the pending, history, and error records are stored after the header and key fields in a variable format.

In the preferred embodiment, the header field of each record contains the following sub-fields: date and time an update to the record was made after a posting event; date and time (or "timestamp") that a record was entered into the computer system, to provide identification of a specific version of a record; the source of the update that created the particular version of the record; the effective date and time, which in the master and history records indicates the time the update was posted to the master database, and in the pending and error records indicates the time the update is intended to take effect; and an operation type (add, modify, or delete). In the preferred embodiment, error records contain an error code field that provides for a multi-character code. (In the preferred embodiment, the error code is the code of the first error encountered during validation of changes). Additional sub-fields may be defined as needed.

In the preferred embodiment, error records are created only when an attempt is made to change a master record or create a pending record through a mechanized "batch update" process, and the change data fails pre-defined validation tests. (In interactive updates of a master record or creation of a pending record, an error can be indicated immediately to a user). As batch updates are processed, they proceed through three stages. First, the system validates each update by checking it against a set of pre-defined rules. For example, the system may ensure that the user who made the update was authorized to do so, and that the data is syntactically correct—that is, of the correct type and within a defined range. The system also checks each update against other, related records to ensure that the update introduces no inconsistencies into the database. If the update is valid, it is put into the pending record file as a pending record. If an update fails validation, an error message is sent to the operator (for manual updates), or the update is stored as an error record until an operator or administrator corrects the errors and resubmits it (for mechanized updates). Finally, the update is sent, or posted, to any operational equipment (for example, telephone switching equipment). After the update data is successfully posted, the system adds the update data to the master database.

The system posts updates in the chronological order in which they are supposed to become effective. For example, in the context of a time-relational database for a telephone system, if an 800-number should be added to the database on Jun. 1, 1991, the system assures that this data is not sent to the master database and any operational equipment before that date.

The version field in the header of each time relational record is provided for several reasons. In the preferred embodiment, posting is by effective date. A user may only be interested in viewing a time relational record of a particular entity as of a given date and updating what is shown. Since each change made is stored in the computer system as a separate version, all changes for a particular date must be merged for this type of access. However, if a need arises to step through each changed version, the version field provides a means for accessing each changed record. In the preferred embodiment, an update may only be made to the last version of a record on a particular date.

Views

Viewed record by record, a database file may not be particularly instructive. Different users require specialized information from a database in order to perform different jobs. The present invention therefore provides different views into a time-relational database. A view can display all of the data in a single record (a "physical record") or pieces of data from several different records (a "logical" or "composite" record)—the data displayed is appropriate to a particular type of task. A view can also be used to enter information needed to carry out an operation that affects one or more records in the database. The view isolates the viewer from the physical design of the database; it provides the data necessary for a specific transaction.

The present invention provides three types of record "views". The "unified view" allows viewing of the time-relational records (i.e., master, pending, history, and error records) associated with an entity. This is the view accessed by a normal user. A "pending management view" is provided to allow viewing of selected pending records by an administrator who may be researching a processing problem. An "error management view" allows viewing of selected error records as a group.

Unified View

The unified view is the normal data entry screen seen by a user for manual updates of the time-relational database of the present invention. A user is given access to the various time-relational records of an entity through the use of function keys, giving a complete time-sequential picture of the data records for an entity. The unified view shows all of the pieces of data that make up a logical record—for example, in the context of a telephone system maintenance database, each subscriber would be an entity. The record for an 800-number subscriber might contain such information items as the name and address of the subscriber, the 800-number itself, a local number that the 800-number is mapped to, and the area codes for service areas in which the 800-number is or is not effective. (As noted previously, the data may actually come from several different physical records, but the data is presented as a single logical record in the unified view).

In the unified view, the invention provides not only the ability to view a record as it exists currently in the master record file, but also what it looked like in earlier versions, or on an earlier date, and what it will look like after future pending changes are applied to it. The unified view also can show what fields in an error record contain invalid data. The unified view provides a user with an extremely convenient means to access a large amount of time-relational data in a clear, coherent, and easily understood manner.

In the present invention, the data from a master record for a particular entity is displayed with default video or character attributes. For example, any common technique, such as a particular color, type face, font size, highlighting, underlining, etc., may be used to denote the data from the master record.

In accordance with the present invention, accessing a history record for an entity causes the data of the history record for fields that differ from the corresponding fields of the master record to be displayed in place of (or "overlaid on") such master record fields, but with a video or character attribute distinct from the default video or character attributes. For example, if the default video or character attribute is "normal" video display (i.e., the system font, with no highlighting, underlining, etc.), then the changed fields of a history record may be displayed with reverse video highlighting.

Similarly, accessing a pending record causes the data of the pending record for fields that differ from the corresponding fields of the master record to be overlaid on such master record fields but with a video or character attribute distinct from the default video or character attributes.

A plurality of history or a plurality of pending records may be "composited" so that all of the changed fields for a set of records from a defined time period can be overlaid on a master record at one time. All changes in a time-sequence of records (e.g., pending or history records) are cumulative, so that the display shows a view of the time-relational data as it was or would be at of a particular point in time. In different terms, when a history or pending record is overlaid on a master record, a new logical record—the current record—is shown on the display. Reading another history or pending record causes the fields of that record to be overlaid on the current record.

Accessing an error record first requires generation of a current record as of the timestamp date of the error record. Thereafter, the data of the error record for fields that differ from the corresponding fields of the generated current record are overlaid on such current record fields but with a video or character attribute distinct from the default video or character attribute. Fields in the error record that are in error (whether changed or not from the master record data) are overlaid on the current record fields but with a video or character attribute distinct from both the default video or character attribute and the video or character attribute used to indicate changed fields in the error record.

It is possible to have different types of highlighting for the different types of records accessible in the unified view. For example, on display of a history record, the differences from the current record may be highlighted in a first color; on display of a pending record, the differences from the current record may be highlighted in a second color; and on display of an error record, the non-error differences from the current record may be highlighted in a third color and the error differences may be highlighted in a fourth color. The video or character attribute in each case is preferably selectable by a database administrator.

Thus, the present invention provides a method of visually indicating to a user all changes between particular history/pending/error records (cumulative over time) and a master record.

Pending Management View

The pending management view is usually used only by the system or database administrator. It shows what database updates are pending; that is, what update data has been entered in the computer system as pending records (manually or from a mechanized input, such as a data tape) but not yet posted to the master record file.

The pending management view lets a user browse through the file of pending records using different record keys. The primary search key of a pending record contains the data field associated with the master record search key, the effective date of the changes, and the timestamp showing the date of entry. By selecting one such key, the pending management view supports selection of logical records based upon primary key, effective date, entry date, and/or entry source.

Error Management View

The error management view may be used by a database administrator to examine, correct, and resubmit update data that has been put into the error file during a batch update. The error management view thus allows a user to step through all erroneous records for a series of particular entities using various types of access. Like the pending management view, the error management view lets a user use alternative search keys to examine records in the error file. Besides the primary key, effective date, entry date, and entry source, the error management view also lets a user select and display update records by error code.

An administrator or supervisor may use the error management view to display or correct all erroneous updates from a particular day or series of days. A user may wish to correct all errors generated because a consistency check failed. For example, an update tape containing seven changed records may result in seven error records because a particular higher-level record, from which the seven changed records depended, had not been added to the database.

Preferred Embodiment of Unified View

Figure 2:
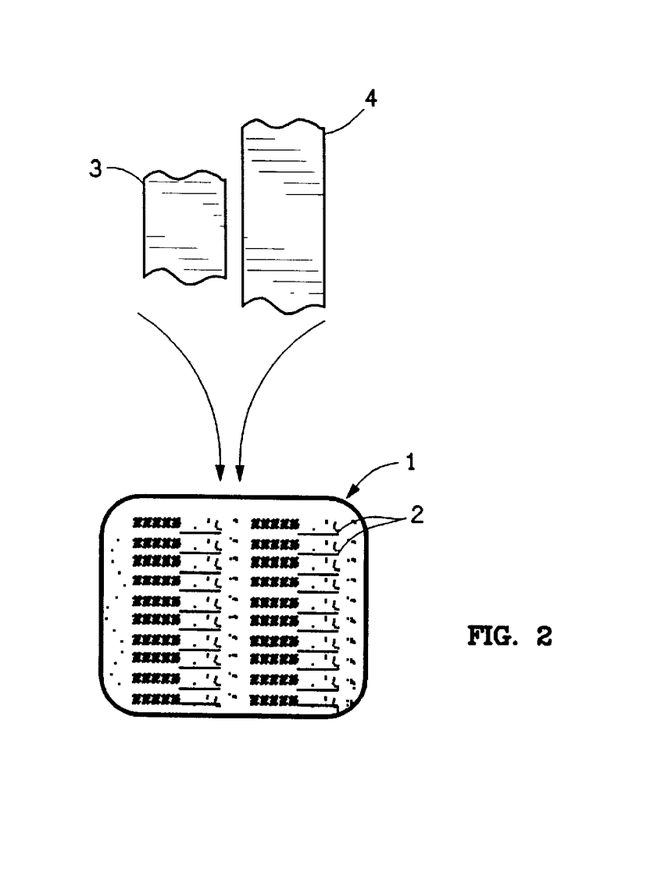
FIG. 2 is a diagram of a computer display screen showing an example of a unified view of a logical record derived from multiple physical records in accordance with the present invention.

The unified view is implemented using a logical record which typically comprises a selection of data from multiple physical records. For example, as shown in FIG. 2, the logical record shown on a display screen 1 may comprise data 2 read from two physical files 3, 4. Generation and display of such a logical record from multiple physical records are well known in the art. The logical record being displayed at any one point in time represents the current record (i.e., the master record with all cumulative changes up to the history/pending/error record shown overlaid on the master record).

Figure 3A:
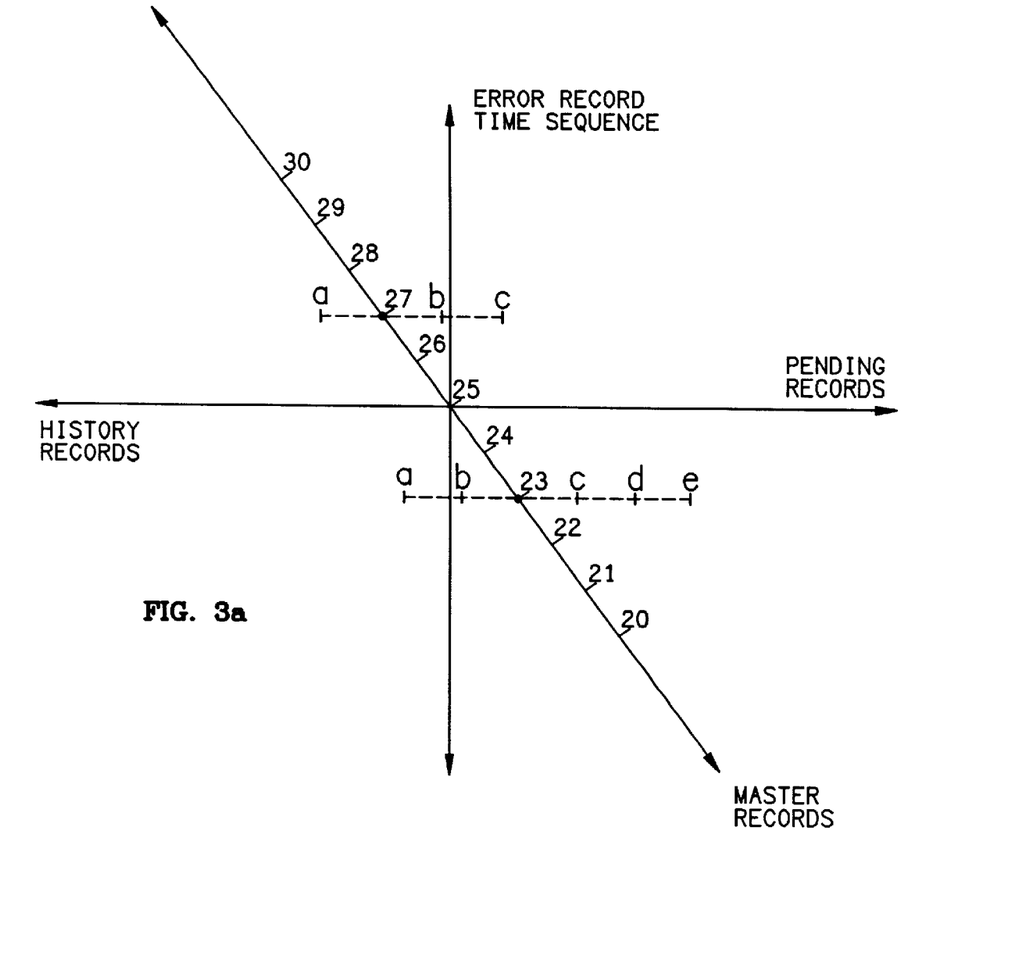
FIG. 3a is a diagram showing a three-dimensional representation of the database structure of a time-relational database management system in accordance with the present invention.

The unified view display screen is the principal access to the distributed application time-relational database. The display screen provides the capability to view distributed time-relational data in chronological or reverse chronological order for each entity (such as a customer). This differs from the traditional database which only allows viewing of records from one entity to another entity in a selected order. This distinction is shown in FIG. 3a, which shows a three-dimensional representation of the database structure of the present time-relational database management system. As can be seen in this example, eleven master records 20–30 are shown. One such master record would correspond to each entity, such as a customer or product. Normal browsing of the master records would traverse the master record axis.

On the orthogonal History/Pending Records axis, by way of example only, the entity having master record 23 has two history records 23a, 23b, and three pending records 23c, 23d, 23e. Similarly, master record 27 has one history record 27a, and two pending records 27b, 27c. Under the present invention, time-relational browsing along the History/Pending Records axis results in a particular display of the data associated with a single master record.

Figure 3B:
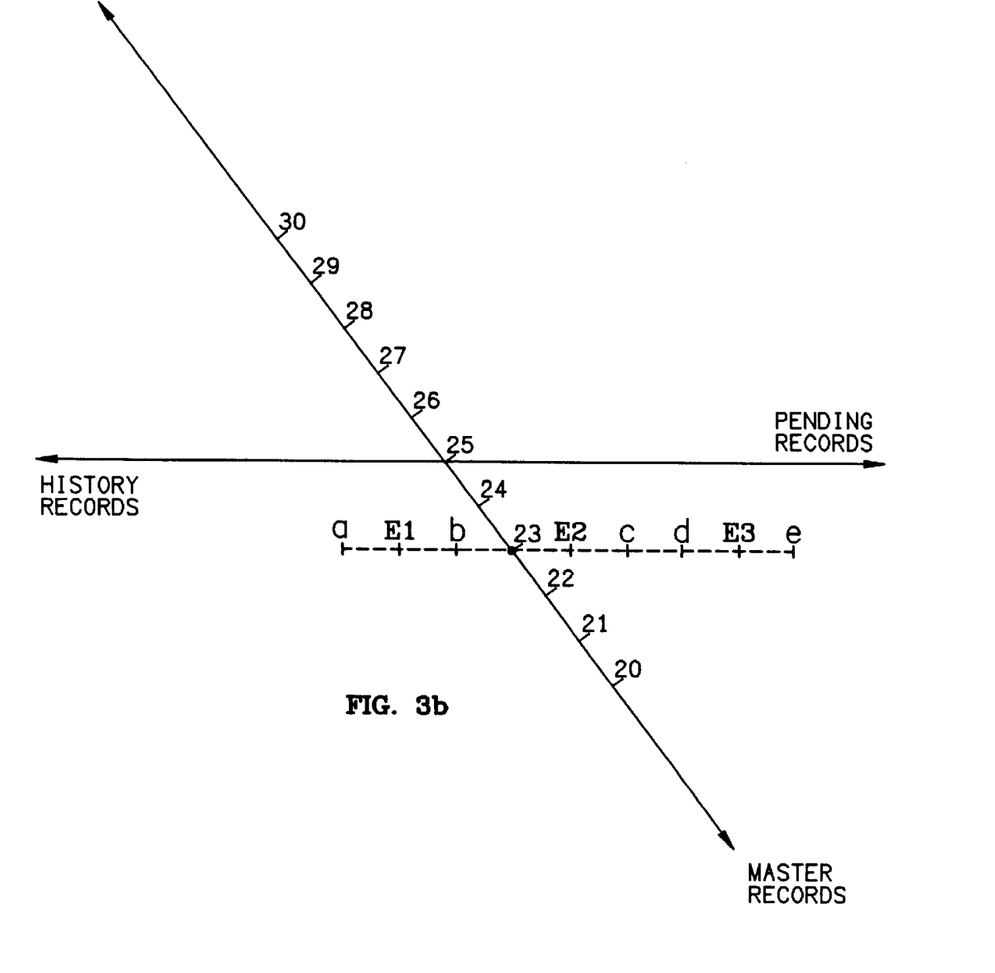
FIG. 3b is a diagram showing an alternative two-dimensional representation of the database structure of a time-relational database management system in accordance with the present invention.

The preferred embodiment of the invention provides that error records are treated as a separate time stream from history and pending records. This is shown diagrammatically in FIG. 3a by the third orthogonal axis marked "Error Record Time Sequence". However, in an alternative embodiment of the invention, the error records may be shown "interleaved" with the history and pending records at the points in time that the changes in the error records were to have been effective. This is shown diagrammatically in FIG. 3b, in which error record E1 is shown in the history file and error records E2 and E3 are shown in the pending file for master record 23. (Since the tentative effective date of error E1 is now in the past, the only way to correct it is to fix all other fields in error and assign it a new effective date).

The unified view display of the present invention thus provides a user with an integrated view of past (history) data, present (master) data, and future (pending) data. This capability exists in a single logical record format, providing the user with the ability to scan forward and backward in time for each entity without confusing changes in display format or necessitating awkward accesses of independent data files.

When a record is first examined in the unified view, the user is in the "day" mode. The day mode shows how the record will look by the end of the day; it thus takes into account all pending records that would be applied if posted that day. This is accomplished by generating a composite record from all versions of a record from a defined time period, which in the preferred embodiment is a day. In the unified view, a "version" of a record is the way the record looks immediately after any particular update is posted. Because more than one update can be entered to become effective on a particular day, multiple versions may exist on the same date. The present invention uses the timestamp of each record (showing when that version was created) to decide which version is earlier. For example, if at 10:00 a.m. today an operator enters a change effective on the next day, and at 3:00 p.m. today someone else enters a change to the same record effective on the next day, the 10:00 a.m. entry is posted first. The 10:00 a.m. change creates a version that is earlier than or "previous" to the 3:00 p.m. version.

Because the timestamp field that defines the version of a record captures time information as well as date information, the "granularity" of the compositing time period can be selected to be something other than a day. For example, if posting of pending records to the master database is infrequent (e.g., twice a day), the time period for compositing records may be selected as a posting period rather than a day. Alternatively, the compositing period can be set to a longer time (e.g., a week) if it is desired to view changes to the master database over a longer time base.

The data fields of the composite record are determined by using the earliest version of a record from the defined time period as a base record. Then, the data fields of the earliest version are compared to the corresponding fields of the next earliest version, and any changed fields are selected from the next earliest version. This process is repeated until all record versions from the defined time period have been compared. The result is a composite record that reflects all changes made during the defined time period. This composite record may then be compared to the current record to determine fields that differ between the two records. The data from the composite record that differs is overlaid on the current record with a video or character attribute different from the default video or character attribute.

As an alternative to the day mode, a version mode is provided. In the version mode, each history/pending/error record is compared to the current record to determine fields that differ. The data from the history/pending/error record that differs is overlaid on the current record with a video or character attribute different from the default video or character attribute.

Figure 4:
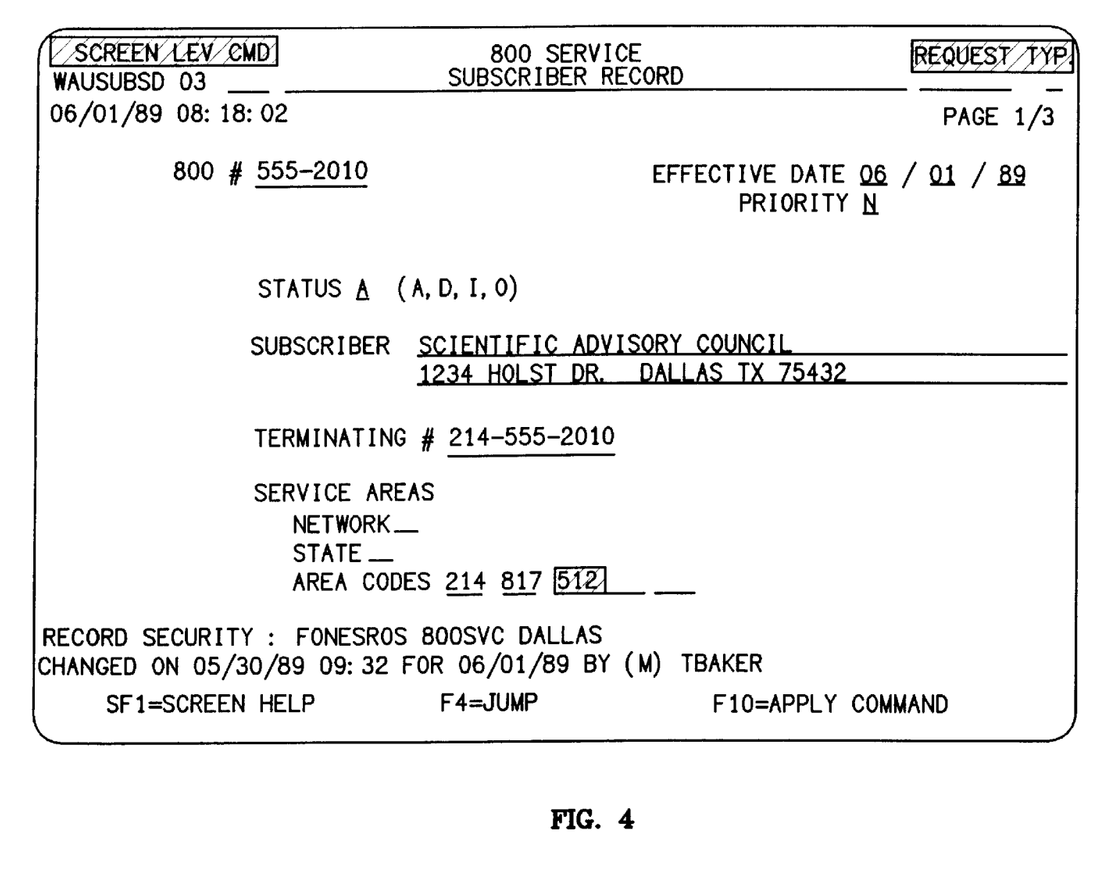
FIG. 4 is a diagram of a computer display screen showing an example of a master record with an overlaid, highlighted data field from a pending record.

Thus, for example, if there are any changes scheduled for the current day that have not yet been posted, they are displayed and highlighted with a video or character attribute different from the default video or character attribute of the remaining part of the data shown in the unified view. FIG. 4 shows an example of a 800-number record 40 with the primary search key 555-2010. The value 512 in the area code field is highlighted in a reverse video field to show that the value displayed is effective as of the end of the current date, but has not yet been posted.

Figure 5:
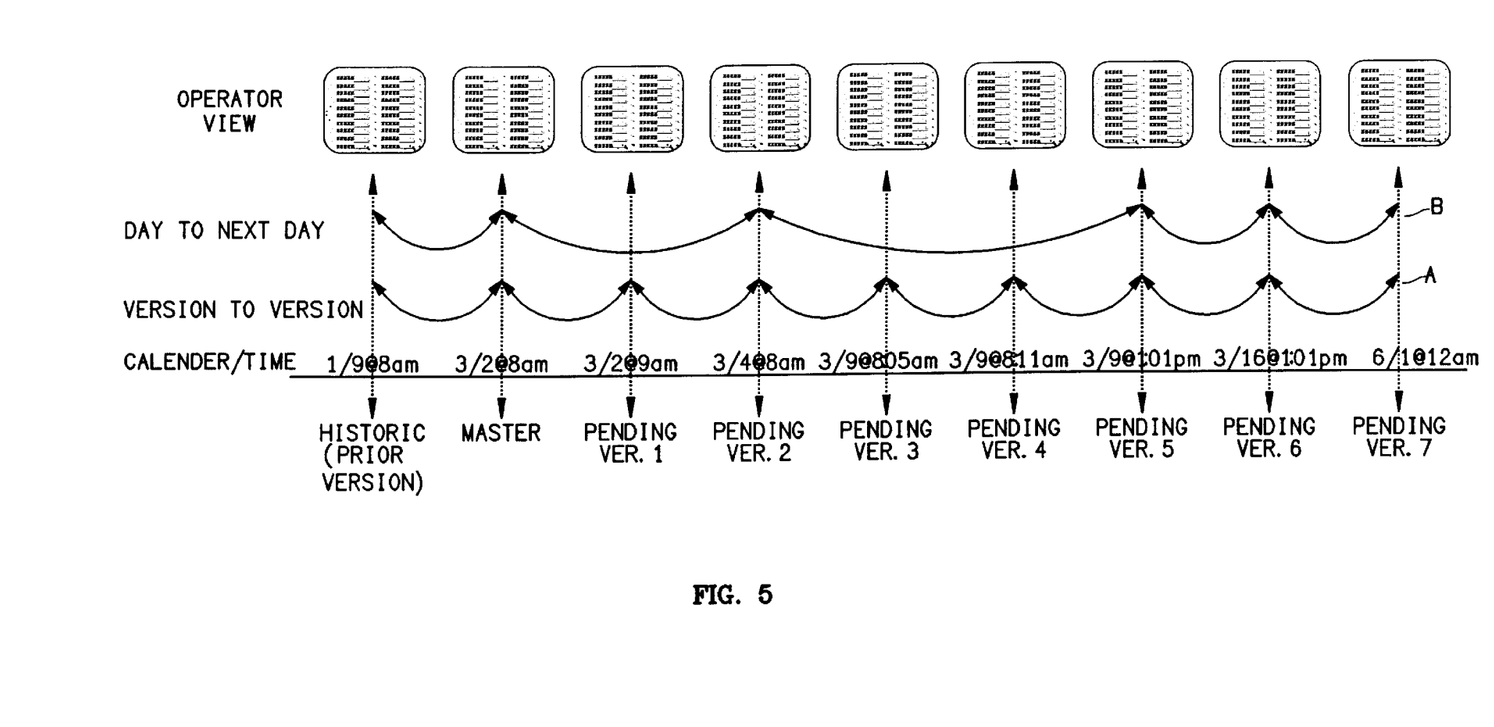
FIG. 5 diagrammatically shows the distinction between day mode and version mode in accordance with the present invention.

FIG. 5 diagrammatically shows the distinction between day mode and version mode. Shown are a master record, one history record, and seven pending records. Pending record v.1 has an effective date that is the same as the current record (i.e., 3/2); pending records v.3, v.4, and v.5 have the same effective date (3/9); the remaining pending records have unique effective dates.

As indicated by the arrows A, traversal from one pending record version to the next version changes the current record only by the changed data in the next version of the pending record. Thus, if the master record is the current record, reading pending record v.1 will cause its changed fields to be overlaid on the master record, thus generating a new current record. Reading pending record v.2 will cause its changed fields to be overlaid on the current record, generating yet another current record.

In contrast, as indicated by the arrows B, traversal from one day to the next may require compositing several records in order to overlay the current record with the data as it looked or would look at the end of the day. For example, if the current record has been generated as of 3/4 (i.e., the master record and pending records v.1 and v.2 have been composited), reading the next pending records by date will cause pending records v.3, v.4, and v.5 from 3/9 to be composited together before being compared with the current record to determine changed fields.

In the preferred embodiment, at the bottom of each display screen of the unified view, there is a status line displaying the information associated with the transaction that generated the version of the data being viewed. Typical information that is shown is the type of transaction that was performed (e.g., add, change, or delete), the entry date and time, and the effective date of the entry. The source of the data is preferably shown also. An example of one such display is shown in FIG. 4.

If there are no changes scheduled for the current date, the status line preferably shows the source of the last change that created the version being displayed. If there are multiple changes scheduled for the current date, the status line preferably shows the source of the last change that has been or will be posted by the end of the day.

In the various views, a number of Read functions are supported in the preferred embodiment of the invention:

Read First

The function results in a Read of the first master record available for access by the user according to the user's current security code.

If an attempt is made to read a record that does not currently exist, but for which there is at least one history record (for example, where the master record has been deleted) or a pending record (for example, where a master record will be added in the future), the system displays a message indicating that the record does not currently exist. If this happens, the user can use the Read Previous or Read Next function keys to find the relevant records. If an attempt is made to read a record which has no history or pending records associated with it, the user will receive an indication that the record was not found.

Read Exact

This function causes the transaction context to switch from error mode to unified view mode. The function results in a Read of the exact record as determined by a user supplied search key and key specifier. To read a current record from the database, a record search key is entered and the Read Exact function key is pressed.

A "Read Exact" request results in the latest version of a record for the day requested (the default being the current date). This version includes unposted changes if configured to do so; otherwise, this version displays the master record. As a user steps through the different time-relational records for an entity, the changed fields are displayed on the screen with different video or character attributes. A flag is preferably provided to indicate that more pending time-relational records are available, or that error records exist related to the displayed data. If other time-relational records are available, the user can step through such records by using the other Read function keys.

Read Approximate

The function results in a Read of the first record which is equal to, or greater than, the user-supplied search key and key specifier. Operation is otherwise like Read Exact.

Read Next

The function results in a Read of the first record which is greater than the user supplied search key and key specifier.

Read Previous by Date

When in unified view mode, this function results in a Read of the first record with the previous effective date. The previous effective date is determined relative to the date of the current record that the user is viewing. This function thus looks backward in time.

The Read Previous by Date function key can be pressed to see what the record looked like on the day of the last change. The system displays the cumulative changes up through that previous date, operating in day mode. The difference between the current record and the previous dates' record is displayed with a video or character attribute different from the default video or character attributes of the master record. If the system can find no earlier version in the history file (an operator periodically backs up and purges outdated history records to make room for more current information), the system will issue a message that the record was not found.

Read Previous Version

When in unified view mode, this function results in a Read of the previous version of the current record. When in error mode, this function results in a read of the previous error record. In either case, the previous version is determined relative to the current record that the user is viewing. This function thus looks backward in time.

This function is similar to the Read Previous by Date function, but differs in that it operates in version mode rather than day mode. This function thus reads only one version at a time, not all versions from a particular day composited together for display. As in the Read by Date functions, differences between the current record and the selected version are indicated to the user by highlighting the changed fields of the selected version.

Read Next by Date

When in unified view mode, this function results in a Read of the first record with the next effective date. The next effective date is determined relative to the date of the current record that the user is viewing. This function thus looks forward in time.

To see how a record will look by the end of the next day on which a change is scheduled, the Read Next by Date function key is pressed. The system reads information about future versions of the current record from the pending record file. Again, the differences between the current record and the next version are highlighted. If there are no remaining records in the pending record file, the system will indicate that a next record was not found.

Read Next Version

When in unified view mode, this function results in a Read of the next version of the current record. When in error mode, this function results in a Read of the next error record. In either case, the next version is determined relative to the current record that the user is viewing.

The Read Next Version function works in the same manner as the Read Previous Version function, except that it looks forward in time in to a next version, rather than backward in time.

Thus, the Read Previous Version and Read Previous by Date keys allow reverse access to time-relational records associated with a particular master record, going as far back as the oldest history record stored in the history file of the database system. Conversely, the Read Next Version and Read Next by Date keys allow forward access to time-relational records associated with a particular master record, going as far forward as the last pending record stored in the pending file of the database system.

Read Error

This function causes the transaction context to switch from unified view mode to error mode. The function results in a Read of the first error record for the user-supplied search key.

In the preferred embodiment of the invention, to enter error mode, the Read Error function key is pressed while reading a record. The system searches the error file for the first update that cannot be posted to the displayed record because it contains invalid data. If the system finds such an error record, it revalidates the update information, then displays the changes that were entered overlaid on the current record (which is made current as of the date of the error record) being displayed. The system also updates the status line to show when the update would have become effective. Fields that were changed but not in error in the error record are indicated on the display with a video or character attribute of a first type, while fields in error in the error record are shown with a video or character attribute of a second type (e.g., changed fields not in error may be in bold text, while error fields may be highlighted). If a field has both a change and an error, the data in the field is marked with the error video or character attribute.

Fields in error may include fields not actually submitted as changes. Before the changes are presented, the record is validated in order to present all error messages associated with the update. If the reason that the error record was generated was because of an outside event (for example, the lack of a record that the changes depended upon), and the outside event had been corrected, a message is displayed to the user to indicate that the changes in the error record are now valid and may be resubmitted for posting (or deleted if desired).

If an update with an error has an effective date that has already passed, the system will show the master record and display the errors overlaid on the current values.

The Read Previous/Next Version function keys allow the user to step through the different error records for an entity (the Read Previous/Next by Date function keys are not meaningful in error mode in the preferred embodiment). Any updates attempted apply to the current record. The user may leave error mode by pressing the Read Exact function key.

When not in error mode, a user may add, update, or delete records. In error mode, a user may only delete the erroneous update, or correct it and resubmit it for validation. In the preferred embodiment, any update to an error record is logged into a transaction log, in known fashion.

As noted previously, in an alternative embodiment of the invention, the error records may be shown "interleaved" with the history and pending records at the points in time that the changes in the error records were to have been effective. The Read Previous Version and Read Next Version keys can be used to access error records "directly" in time sequence with an entity's history and pending records, without the need to initiate a distinct error mode.

By displaying changed or error data overlaid on the corresponding fields of the current record with a distinct video or character attribute, a user can quickly and easily discern small differences between the data fields from one time-related record to a next. The possibility for error and confusion is thus substantially reduced.

A number of embodiments of the present invention have been described. Nevertheless, it will be understood that various modifications may be made without departing from the spirit and scope of the invention. For example, any means of visually marking the data in changed fields that differ between the master record and history/pending/error records may be used. As another example, as a convenience to the user, if any of the Read Next/Previous Version or Read Next/Previous by Date function keys are used without a previous Read Exact operation, a Read Exact operation may be executed first with the search key provided. Further, security codes and access levels can be implemented in the preferred embodiment of the invention to permit a user to be able to access only selected records. Accordingly, it is to be understood that the invention is not to be limited by the specific illustrated embodiment, but only by the scope of the appended claims.

We claim:

1. In an interactive data entry system wherein a user is presented with a data entry screen, a method for selecting and representing time-varying data from a time-relational database management system having a plurality of timestamped versions of master, pending, and history records each comprising at least one data field and displayable at least in part as logical records, comprising the steps of:
   a. initially displaying on the data entry screen a logical master record as a current record with a default attribute;
   b. enabling selection by the user of one of a pending record or history record by timestamp version as a selected record, and in response to such selection:
      (1) reading the selected record;
      (2) comparing the data fields of the selected record to the corresponding data fields of the current record;
      (3) selecting as difference fields all data fields from the selected record that differ from the corresponding data fields of the current record;
      (4) displaying on the data entry screen the selected difference fields from the selected record overlaid on the corresponding data fields of the displayed current record to generate a next current record, the selected difference fields being displayed with an attribute distinct from the default attribute.

2. The method of claim 1, wherein attributes of the current record and the selected difference fields are user-definable.

3. In an interactive data entry system wherein a user is presented with a data entry screen, a method for selecting and representing time-varying data from a time-relational database management system having a plurality of timestamped versions of master, pending, and history records each comprising at least one data field and displayable at least in part as logical records, comprising the steps of:
   a. initially displaying on the data entry screen a logical master record as a current record with a default attribute;
   b. enabling selection by the user of one of a group of pending records or history records having a timestamp version within a predefined time period as selected records, and in response to such selection:
      (1) time-sequentially reading the selected records;
      (2) generating a composite record by selecting all of the data fields of the earliest version of the selected records as an initial composite record, then comparing the data fields of the next earliest version of the selected records to the corresponding data fields of the composite record, selecting all data fields from said next earliest version that differ from the corresponding data fields of the composite record, overlaying the selected data fields on the corresponding data fields of the composite record to generate a next composite record, and repeating such comparison, selection, and overlaying for all selected records;
      (3) comparing the data fields of the composite record to the corresponding data fields of the current record;
      (4) selecting as difference fields all data fields from the composite record that differ from the corresponding data fields of the current record;
      (5) displaying on the data entry screen the selected difference fields from the composite record overlaid on the corresponding data fields of the displayed current record to generate a next current record, the selected difference fields being displayed with an attribute distinct from the default attribute.

4. The method of claim 3, wherein attributes of the current record and the selected difference fields are user-definable.

5. The method of claim 3, wherein the predefined time period is user-definable.

6. In an interactive data entry system wherein a user is presented with a data entry screen, a method for selecting and representing time-varying data from a time-relational database management system having a plurality of timestamped versions of master, and error records each comprising at least one data field and displayable at least in part as logical records, comprising the steps of:
   a. initially displaying on the data entry screen a logical master record as a current record with a default attribute;
   b. enabling selection by the user of an error record as a selected record, and in response to such selection:
      (1) reading the selected record;
      (2) validating the data fields of the selected record to determine which data fields are in error;
      (3) comparing the data fields of the selected record to the corresponding data fields of the current record;
      (4) selecting as difference fields all data fields from the selected record that differ from the corresponding data fields of the current record and selecting as error fields all data fields from the selected record which are in error;
      (5) displaying on the data entry screen the selected difference fields and the selected error fields from the selected record overlaid on the corresponding data fields of the displayed current record to generate a next current record, the selected difference fields being displayed with an attribute distinct from the default attribute, and the selected error fields being displayed with an attribute distinct from the default attribute and distinct from the attribute used to display the selected difference fields.

7. The method of claim 6, wherein the attributes of the current record, the selected difference fields, and the selected error fields are user-definable.

8. The method of claim 6, wherein selected records are displayed in time-sequential order.

9. The method of claim 8, wherein selected records are displayed in time-sequential order in time-sequence with the history and pending records.

10. In an interactive data entry system wherein a user is presented with a data entry screen, a method for representing time-varying data from a time-relational database management system having a plurality of time-differentiated records, each record including a plurality of data fields, the method comprising the steps of:

a) reading a first record:
   b) displaying on the data entry screen the first record with a first character attribute;
   c) enabling selection by the user of a second record;
   d) reading the second record in response to the user selection;
   e) comparing each of a plurality of data fields of the first record with each of a corresponding plurality of data fields of the second record; and
   f) displaying on the data entry screen with a second character attribute different from the first character attribute only those data fields wherein the comparing step indicates a difference between the corresponding data fields of the first and second records, while continuing to display the remaining data fields with a character attribute different from the second character attribute, wherein the different data fields of the second record are overlaid on the corresponding data fields of the first record.

11. The method of claim 10, wherein the second record is a logical composite record constructed from data contained in a plurality of time-differentiated physical records within a selected time period, and wherein the step of reading the second record includes reading the plurality of time-differentiated physical records.

12. The method of claim 10, wherein the time-differentiated records include master and history records.

13. The method of claim 12, wherein the time-differentiated records further include pending records.

14. The method of claim 13, wherein the time-differentiated records further include error records.

* * * * *